United States Patent [19]

Kneezel et al.

[11] Patent Number: 4,864,329

[45] Date of Patent: Sep. 5, 1989

[54] FLUID HANDLING DEVICE WITH FILTER AND FABRICATION PROCESS THEREFOR

[75] Inventors: Gary A. Kneezel, Webster; Donald J. Drake; Almon P. Fisher, both of Rochester, all of N.Y.

[73] Assignee: Xerox Corporation, Stamford, Conn.

[21] Appl. No.: 247,819

[22] Filed: Sep. 22, 1988

[51] Int. Cl.[4] .......... G01D 15/16; B41J 3/04

[52] U.S. Cl. .......... 346/140 R; 156/644; 210/483; 346/1.1

[58] Field of Search .......... 346/140, 1.1; 156/644; 204/11; 210/499, 489, 483, 348

[56] References Cited

U.S. PATENT DOCUMENTS

| | | | |
|---|---|---|---|
| Re. 32,572 | 1/1988 | Hawkins et al. | 156/626 |
| 3,606,973 | 9/1971 | Davis | 346/75 |
| 4,251,824 | 2/1981 | Hara et al. | 346/140 R |
| 4,380,770 | 4/1983 | Maruyama | 346/140 R |
| 4,514,743 | 4/1985 | Roschlein | 346/140 |
| 4,571,599 | 2/1986 | Rezanka | 346/140 R |
| 4,639,748 | 1/1987 | Drake et al. | 346/140 R |
| 4,673,955 | 6/1987 | Ameyama et al. | 346/140 R |
| 4,678,529 | 7/1987 | Drake et al. | 156/234 |
| 4,789,425 | 12/1988 | Drake | 156/644 |
| 4,814,786 | 3/1989 | Hoisington | 346/140 X |

OTHER PUBLICATIONS

Kendall et al.; Combined Nozzle and Filter Assembly and its Fabrication, IBM TDB, vol. 22, No. 8A, Jan. 1980, pp. 3441–3442.

*Primary Examiner*—Joseph W. Hartary

*Attorney, Agent, or Firm*—Robert A. Chittum

[57] ABSTRACT

Relatively small fluid handling devices having a filter bonded on the surface containing the fluid inlets. An example of such a device is a thermal ink jet printhead. A substantially flat filter is placed at the ink inlet to the printhead by a fabrication process which laminates a wafer sized filter to the aligned and bonded wafers containing a plurality of printheads. The individual printheads are obtained by a sectioning operation, which cuts through the two or more bonded wafers and the filter. The filter may be a woven mesh screen or, preferably, an electroformed screen with a predetermined pore size. Since the filter covers one entire side of the printhead, the relatively large contact area prevents delamination and enables convenient leak-free sealing. The filter prevents the entrance of contaminants into the relatively large inlets of the printhead at an early stage of assembly and packaging.

18 Claims, 5 Drawing Sheets

FLUID HANDLING DEVICE WITH FILTER AND FABRICATION PROCESS THEREFOR

BACKGROUND OF THE INVENTION

1. Field of the Invention

This invention relates to relatively small fluid filtering devices and their fabrication processes, and more particularly to an ink jet printhead having a substantially flat laminated filter and process for fabricating the printhead with such filter.

2. Description of the Prior Art

There are many well known, relatively small fluid handling devices which contain a filter for preventing contaminates entrained in a fluid from entering the device. Generally, the filters are individually assembled in or attached to each separate device during manufacture. A typical example of a small fluid handling device is a thermal ink jet printhead.

A typical thermally actuated drop-on-demand ink jet printing system uses thermal energy pulses to produce vapor bubbles in an inkfilled channel that expels droplets from the channel orifices of the printing systems printhead. Such printheads have one or more ink filled channels communicating at one end with a relatively small ink supply chamber and having an orifice at the opposite end, also referred to as a nozzle. A thermal energy generator, usually a resistor, is located in the channels near the nozzle and a predetermined distance upstream therefrom. The resistors are individually addressed with a current pulse to momentarily vaporize the ink and form a bubble which expels an ink droplet. A meniscus is formed at each nozzle under a slight negative pressure to prevent ink from weeping therefrom.

U.S. Pat. No. 4,639,748 to Drake et al discloses a thermal ink jet printhead composed of two parts aligned and bonded together. One part is a substantially flat substrate which contains on the surface thereof a linear array of heating elements and addressing electrodes. The other part is a flat substrate having a set of concurrently etched recesses in one surface. The set of recesses include a parallel array of elongated recesses for use as capillary filled ink channels having ink droplet emitting nozzles at one end and having interconnection with a common ink supplying manifold recess at the other ends. The manifold recess contains an integral closed wall defining a chamber within the manifold recess and ink fill hole. Small passageways are formed in the top edge of the internal chamber walls to permit passage of ink therefrom into the manifold. Each of the passageways have smaller cross sectional flow areas than the nozzle to filter the ink, while the total cross sectional flow area of the passageways is larger than the total cross sectional flow areas of the nozzle. Many printheads can be made simultaneously by producing a plurality of sets of heating element arrays with their addressing electrodes on a silicon wafer and by placing alignment marks thereon at predetermined locations. A corresponding plurality of sets of channels and associated manifold with internal filters are produced in a second silicon wafer and in one embodiment alignment openings are etched thereon at predetermined locations. The two wafers are aligned via the alignment openings and alignment marks and then bonded together and diced into many separate printheads.

U.S. Pat. No. 4,251,824 to Hara et al discloses a thermal ink jet printhead having a filter at the ink supply inlet to the printhead. U.S. Pat. No. 4,380,770 to Maruyama discloses an ink jet printhead having an embodiment shown in FIG. 6 that uses a linear array of grooves to filter the ink. The above references disclose the assembly of individual filters for each printhead or the incorporation of integral filters which require more complicated photolithographically patterned printhead parts.

U.S. Pat. No. 4,673,955 to Ameyama et al discloses an ink reservoir for a drop-on-demand ink jet printer. The reservoir contains a relatively large ink supply chamber and a smaller ink chamber. Ink from the smaller chamber is in communication with the ink jet printhead. The larger ink supply chamber is hermetically sealed and in communication with the smaller chamber through a filter.

SUMMARY OF THE INVENTION

It is an object of the present invention to provide a fluid filtering system for each of a plurality of fluid filtering devices by laminating a substantially flat, wafer-size filter to the fluid inlet side of a wafer-size fluid handling substrate containing a plurality of fluid handling devices. After lamination of the filter to the substrate, the substrate and filter assembly is sectioned into a plurality of separate devices.

It is another object of the present invention to provide an ink filtering system for each of a plurality of ink jet printheads by laminating a substantially flat wafer size filter to the ink inlet substrate or wafer containing a plurality of ink channel plates. Lamination of filter to the channel wafer may be done before or after assembly with the equal size substrate containing the plurality of sets of heating elements and their addressing electrodes as taught by the above-referenced U.S. Pat. No. 4,639,748. Individual printheads are typically formed by dicing the wafer-filter assembly.

It is still another object of this invention to use a substantially flat filter having a construction which minimizes dicing blade wear, minimizes thickness of adhesive required, and enables convenient sealing, for example, to ink supply cartridges of the type disclosed in U.S. Pat. No. 4,571,599 to Rezanka.

In the present invention, a plurality of ink jet printheads with laminated filters are fabricated from two (100) silicon wafers, the printheads being representative of a typical relatively small fluid handling device. A plurality of sets of heating elements and their individually addressing electrodes are formed on the surface of one of the wafers, and a corresponding plurality of sets of parallel channels, each channel set communicating with a recessed manifold, are formed in a surface of the other wafer. A fill hole for each manifold and means for alignment are formed in the other surface of the wafer with the channels. Alignment marks are formed at predetermined locations on the wafer surface having the heating elements. A wafer-sized flat membrane filter is laminated on the wafer surface having the fill holes. The wafer surface with the channels are aligned with the heating elements via the alignment means and alignment marks and bonded together. The filter may be laminated on the wafer surface having the fill holes before or after this wafer is bonded to the wafer having the heating elements. A plurality of individual printheads are obtained by concurrently dicing the two bonded wafers and the laminated filter. Each printhead is sealingly bonded to an ink supply cartridge while the other side of the printhead is mounted on a daughter board as taught by U.S. Pat. No. 4,639,748 to Drake et al.

In such an ink jet printhead as described above, the nozzles have very small flow areas. This necessitates the use of fine filtration systems to prevent contaminating particles from clogging the printhead nozzles. For maximum effectiveness, ink filtration should occur at the printhead interface with the ink supply in order to filter as close to the nozzles as possible and yet not restrict the ink flow. To be fully effective, the wafer-sized flat filter must have a construction that minimizes dicing blade wear. In the preferred embodiment, the filter is electroformed.

In addition to filtering contamination from the ink and ink supply system during printing, the laminated filter also keeps dirt and other contamination from entering the large ink inlets during printhead assembly.

The foregoing features and other objects will become apparent from a reading of the following specification in connection with the drawings, wherein like parts have the same index numerals.

DESCRIPTION OF THE PREFERRED EMBODIMENT

Figure 1:
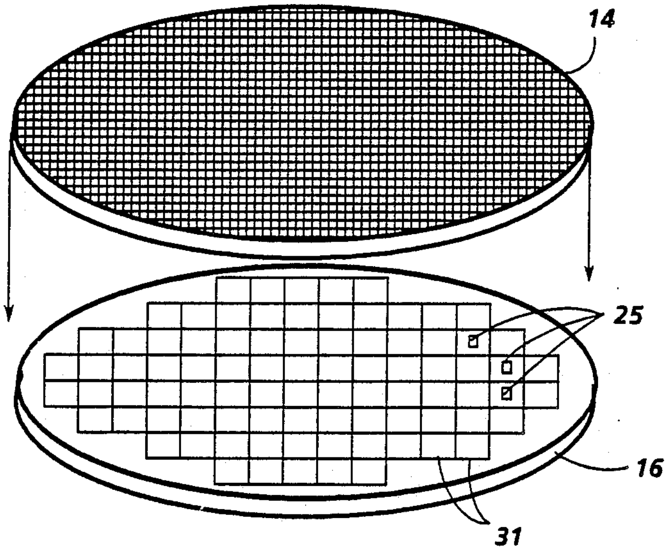
FIG. 1 is a schematic isometric view of an ink inlet substrate and equal sized substantially flat filter of the present invention spaced therefrom.
Figure 2:
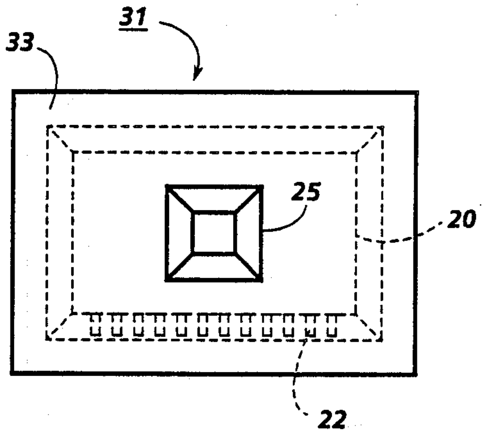
FIG. 2 is a schematic plan view of one of a plurality of ink inlet plates contained by the wafer in FIG. 1, showing its fill hole.
Figure 6:
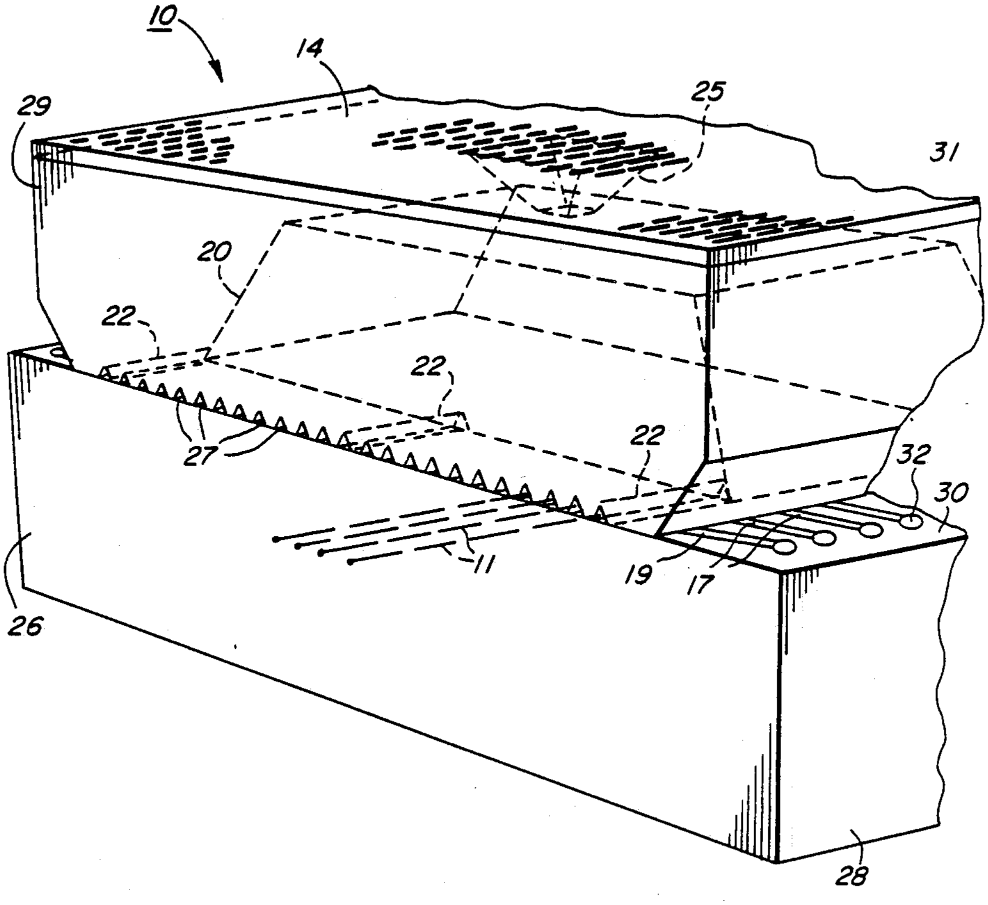
FIG. 6 is a partially shown, enlarged isometric view of a single printhead having the filter of the present invention and showing the ink droplet emitting nozzles.

In FIG. 1, a two side polished, (100) silicon wafer 16 is used to produce a plurality of upper substrates or channel plates 31 for the printhead 10, shown in FIG. 6. After the wafer is chemically cleaned, a pyrolytic CVD silicon nitride layer (not shown) is deposited on both sides. Using conventional photolithography, a via for fill hole 25 for each of the plurality of channel plates 31 and at least two vias for alignment openings or pits (not shown) at predetermined locations are printed on the wafer side shown in this Figure. The silicon nitride is plasma etched off of the patterned vias representing the fill holes and alignment openings. As disclosed in the above-mentioned U.S. Pat. Nos. 4,639,748 or Re. 32,572 to Hawkins et al, a potassium hydroxide (KOH) anisotropic etch is used to etch the fill holes and alignment openings. In this case, the {111} planes of the (100) wafer make an angle of 54.7° with the surface 33 of the wafer. The fill holes, shown in FIG. 2, are small square patterns of about 20 mils or 0.5 millimeter per side and the alignment openings (not shown) are about 60 to 80 mils or 1.5 to 2.0 millimeters square. Thus the alignment openings are etched entirely through the 20 mil or 0.5 millimeter thick wafer, while the fill holes are etched to a terminating apex at about half to three-quarters through the wafer. The relatively small square fill hole is invariant to further size increase with continued etching, so that the etching of the alignment openings and fill holes are not significantly time constrained. This etching takes about two hours and many wafers can be simultaneously processed. The channel plate can also be fabricated by a one-sided photolithography and a multi-step etching process as described in copending U.S. patent application Ser. no. 234,994 to Hawkins, filed Aug. 22, 1988.

Next, the opposite side of wafer 16 is photolithographically patterned, using the previously etched alignment holes as a reference, to form the relatively large rectangular recess 20 and associated plurality of triangular channel grooves 22 (see FIG. 2) which will eventually become the ink manifolds and ink channels of the printheads, respectively.

FIG. 2 is a schematic plan view of the a portion of the silicon wafer 16 representing one of a plurality of etched channel plates contained in the wafer, and showing the manifold recess 20 and plurality of ink channel recesses 22 in dashed line. The fabricating process for the printhead is disclosed in U.S. Pat. Nos. Re. 32,572 to Hawkins et al and 4,678,529 to Drake et al, and these two patents are incorporated herein by reference. Alternatively, the single side, multi-step etching process may be used as disclosed in the above-mentioned pending application Ser. No. 234,994 to Hawkins to form the channel plates. These steps of opening the ink channels 22 to the manifold recess 20 and opening the fill hole reservoir into the manifold recess 20 are fully disclosed in those patents incorporated herein by reference. Typically, the channel wafer and heater wafer are aligned and bonded together as disclosed in U.S. Pat. No. 4,678,529 to Drake et al prior to filter lamination. The surface 33 of silicon wafer 16 is prepared for adhering equal sized filter 14 thereto in the same manner as disclosed in the U.S. Pat. No. 4,678,529 to Drake et al. Basically, the method of bonding the filter 14 to the channel wafer 16 is accomplished by coating a flexible substrate (not shown) with a relatively thin uniform layer of adhesive having an intermediate non-tacky curing stage with a shelf life of around one month for ease of alignment of parts and ease of storage of the components having the adhesive thereon. About half of the adhesive layer on the flexible substrate is transferred to the surface of 33 of the wafer within a predetermined time of the coating of the flexible substrate by placing it in contact therewith and applying a predetermined temperature and pressure to the flexible substrate prior to peeling it from the channel wafer. This causes the adhesive to fail cohesively in the liquid state, assuring that about half of the thickness of the adhesive layer stays with the flexible substrate and is discarded therewith, leaving a very thin uniform layer of adhesive on the channel wafer surface 33 without permitting the adhesive to flow into the fill hole edges. The transferred adhesive layer remaining on the wafer surface enters in an intermediate, non-tacky curing stage to assist in subsequent alignment of the filter. The filter 14 and the etch channel wafer 16 are cured to complete the bonding of the filter thereto.

Figure 3:
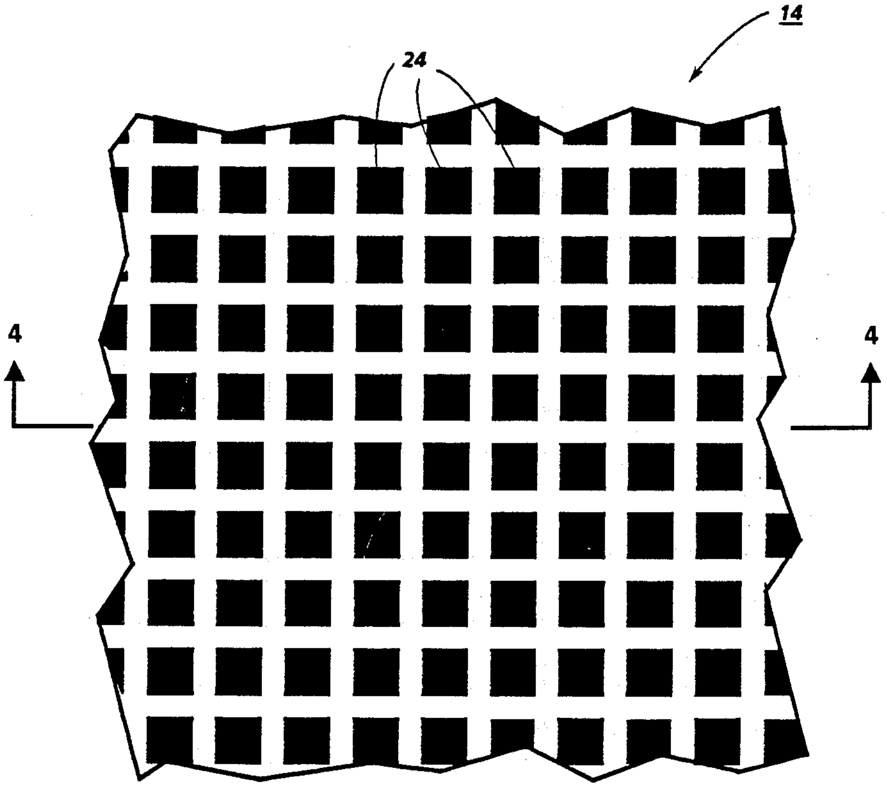
FIG. 3 is an enlarged partially shown plan view of the substantially flat filter of the present invention and shown in FIG. 1.

FIG. 3 is an enlarged, partially shown plan view of an electroformed filter. The solid black squares 24 represent through holes referred to in the filter industry as pores. The filter may be 1-100 microns thick and provides pore sizes equal to or smaller than the flow areas of the printhead nozzles. This typically provides a flow area through the filter of 50%. Such an electroformed filter may be manufactured in-house or purchased commercially. The filter material must be a plateable material that is corrosion resistant to ink, diceable, and robust enough to permit handling. One such material is nickel.

Figure 4:
FIG. 4 is a cross sectional view of the filter as viewed along view line 4—4 of FIG. 3.

FIG. 4 is a cross sectional view of the filter as viewed along view line 4—4 of FIG. 3 and shows that there can be no lateral leakage between pores 24 of the filter 14.

Figure 5:
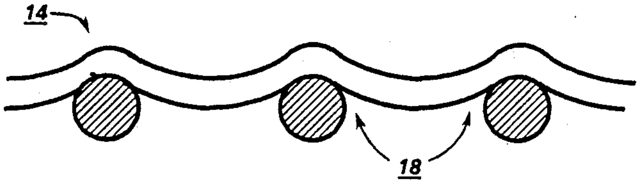
FIG. 5 is a cross sectional view of an alternate embodiment of the filter.

FIG. 5 is an alternate embodiment of the filter 14. It is a fine mesh screen filter 15 which is also laminated to the wafer 16. For corrosion resistance, a stainless steel woven mesh filter may be used, but other woven materials, such as nylon, are possible alternatives. However, lateral air gaps 18 are formed where the stainless steel wires composing the filter cross. Consequently, a woven filter must be well sealed around both the fill hole and the ink supply cartridge outlet.

Excessive dicing saw wear can be avoided with the filter configuration of FIG. 3 because the filter material can be, for example, nickel rather than a material such as stainless steel which is twice as hard as the saw blade bonding matrix holding the diamond particles to the dicing blade. The electroformed filters are of a good strength and can be extremely thin. For a 300 spots per inch (spi) printhead, a filter pore size of 5–30 microns would typically be used. Such a filter is commercially available from, for example, Buckbee-Mears. It has a thickness of 4–7 microns and has a uniform precise pore size that provides absolute filtration because it is controlled by the photolithography of positive photoresist. These filters are easy to seal since their basic topography is extremely flat and, as long as the sealing gasket is several times wider than the pore size, no lateral leakage will occur. The fluid resistance is very low because the filter is extremely thin and can be made with relatively high transmission values. A 4 micron thick electroformed filter in a 1,000 line per inch square grid pattern with an 18 micron square pore size has a transmission value of 50%. Other pore shapes are acceptable, so long as the pore area is about 300 square microns. This is about twice the transmission value of a commercially available fine mesh woven filter 15 shown in FIG. 5. Therefore, electroformed flat filters are generally more desirable for small fluid filtering devices because of the increase in fluid transmission.

In addition to filtering out contamination from the ink and ink supply system during printing, the filter also keeps dirt and other debris from entering the relatively large inlets during printhead assembly. In this way, it is possible to use less stringently clean and, therefore, less expensive assembly rooms for printhead manufacture, after the filter has been bonded in place. Operations up through assembly of the filter onto the bonded channel and heater wafers will need to occur in a clean room or under a clean hood, while subsequent operations can compromise somewhat on cleanliness. A further advance is that the laminated filter provides some reinforcement of the razor-sharp and fragile edges of orientation dependently etched silicon holes.

Figure 7:
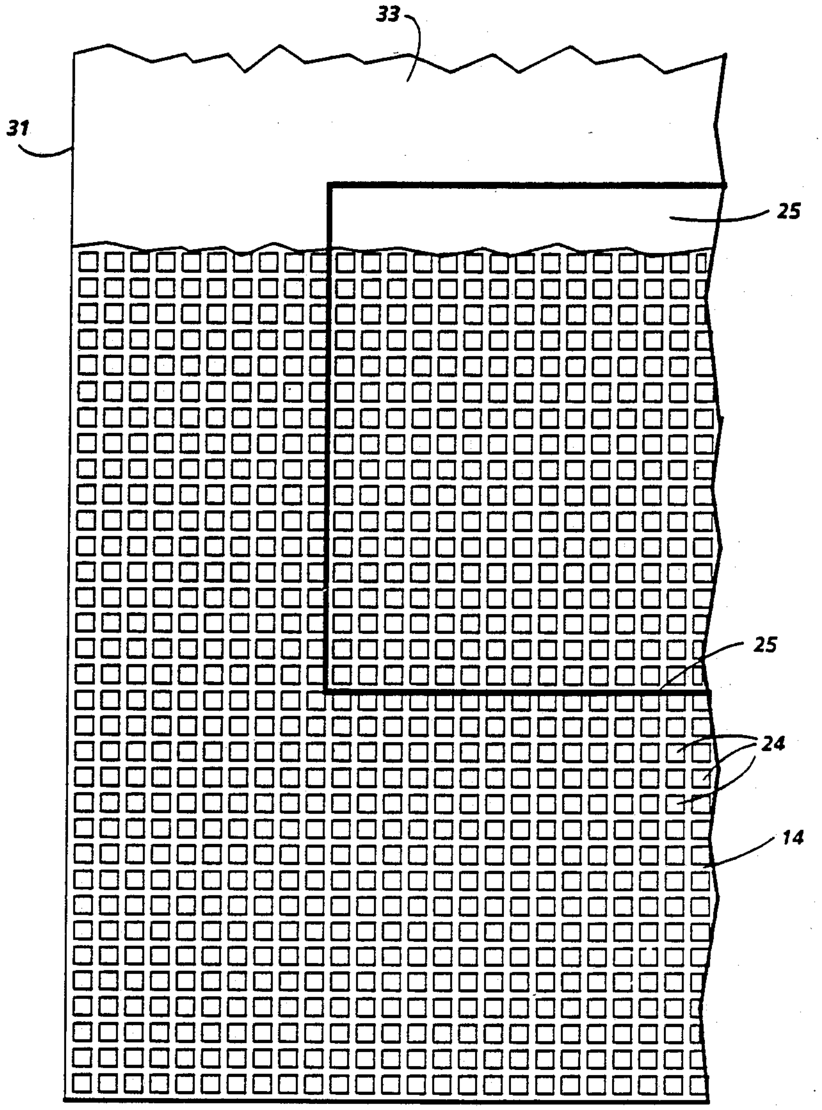
FIG. 7 is a partially shown top view of FIG. 6.

In FIG. 6, a schematic representation of the printhead 10 of the present invention is partially shown in isometric view with the trajectories 11 of droplets 12 shown in dashed line. The printhead comprises a channel plate 31 permanently bonded to heater plate 28. The channel plate is silicon and the heater plate may be any insulative or semiconductive material as disclosed in the above-referenced reissue patent to Hawkins et al. Channel plate 31 contains an etched recess 20, shown in dashed line, in one surface which, when mated to the heater plate 28, forms an ink reservoir or manifold. A plurality of identical parallel grooves 22, shown in dashed line and having triangular cross sections, are etched in the same surface of the channel plate with one of the ends thereof penetrating the front face 29 thereof. The other ends of the grooves open into the recess 20. When the channel plate and heater plate are mated, the groove penetrations through edge 29 produce the orifices 27 and the grooves 22 serve as ink channels which connect the manifold with the orifices. Opening 25 in the channel plate provides means for maintaining a supply of ink in the manifold from an ink supply source (not shown). Filter 14 of the present invention has been adhesively bonded to the fill hole side of the channel plate by the adhesive transfer method of U.S. Pat. No. 4,678,529. An enlarged plan view of a portion of the filter 14 in the vicinity of the fill hole 25 is shown in FIG. 7. The filter pores 24 are clear over the fill hole 25, but in the areas contacting the channel plate surface 33, the adhesive has entered the filter pores 24 and bonded the filter to the channel plate. Use of the electroformed filter screen of the present invention are preferably used in full wafer diameter size and after being bonded to surface 33 of wafer containing a plurality of channel plates 31, are diced into individual printheads with a yield of 100%. The filter remains covering the entire surface of each separate channel plate.

Figure 8:
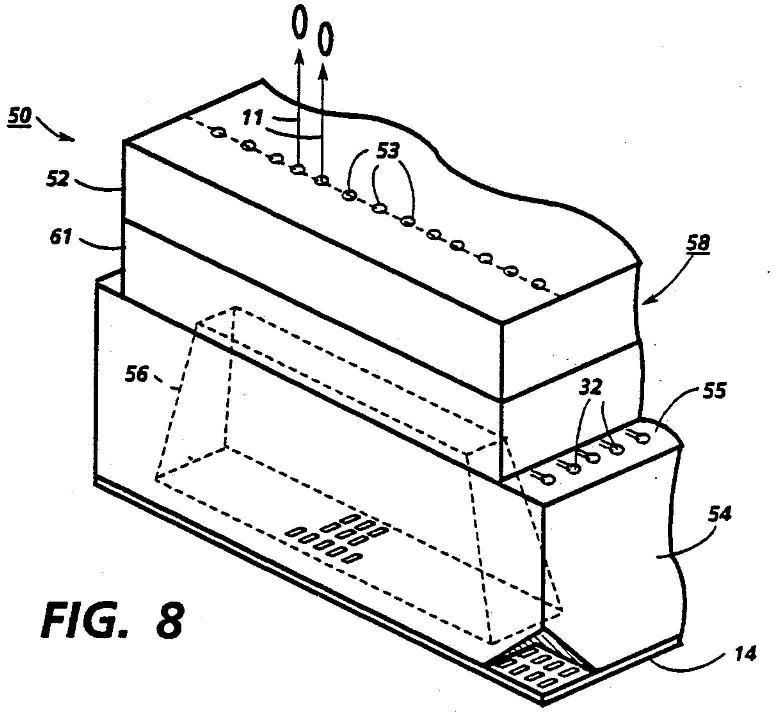
FIG. 8 is a partially shown enlarged isometric view of a single printhead having a roofshooter configuration and the filter of the present invention covering the ink fill hole.

FIG. 8 is an enlarged isometric view of a printhead 50 having a roofshooter configuration, showing the ink droplet emitting nozzles 53 with the elongated ink filling slot and partial reservoir 56 shown in dashed line, together with the filter 14 of the present invention, preferably an electroformed filter, bonded on the bottom thereof to filter the ink entering the reservoir 56. The roofshooter printhead 50 is partially shown with arrows 11 depicting the trajectories of droplets 12 emitted from orifices or nozzles 53. The printhead 50 comprises a structural member 58 permanently attached to heater plate 54. The material of the heater substrate can be, for example, silicon because of the low cost bulk manufacturing capability for such plates as disclosed in the U.S. reissue patent to Hawkins et al mentioned above. Heater substrate 54 contains an etched opening 56, shown in dashed line, which when mated to structural member 58 forms an ink inlet and reservoir or manifold as discussed in detail in pending application Ser. No. 82,417, filed Aug. 6, 1987, to Drake et al and entitled "Thermal Ink Jet Printhead Fabricating Process". Electrode terminals 32 extend beyond the structural element 58 and lie at the edge of surface 55 of the heater substrate 54. Structural member 58 comprises two members which are laminated together. One is an ink flow directing layer 51, which is a patternable material delineated by photosensitization, exposure, and development. It can be delineated by either wet or dry etching through a patterned mask. Layer 51 is patterned to define ink flow directing walls which prevent cross talk between the individually addressed heating elements. The other member is a nozzle plate 52, which is generally a dry film photoresist placed on the patternable material layer 51 and aligned, imaged, and developed to form a roof having nozzles 53 therein. Again, the filter 14 covers the entire bottom of the printhead 50 containing the ink inlet 56.

Figure 9:
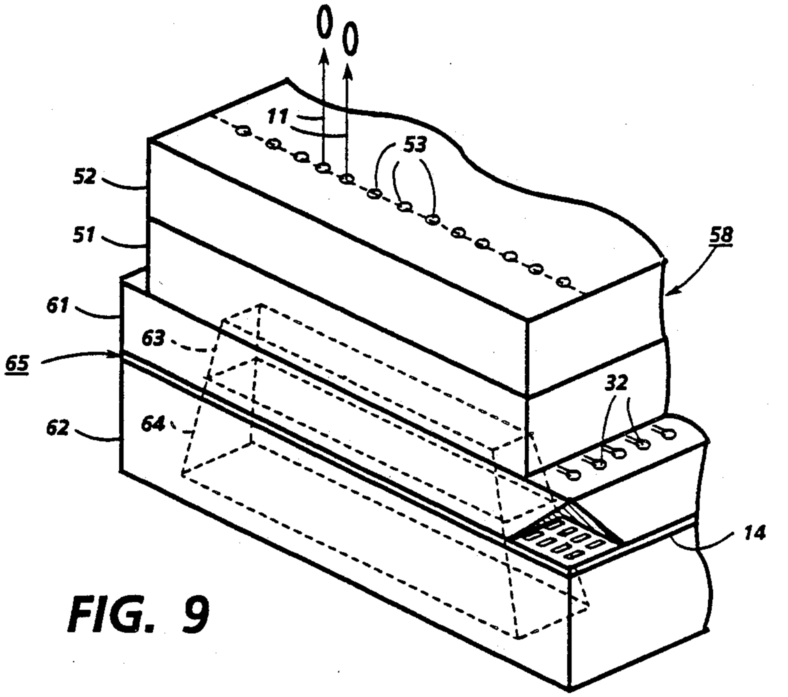
FIG. 9 is a partially shown, enlarged isometric view of an alternate embodiment of the printhead shown in FIG. 8.

FIG. 9 is an enlarged isometric view of a printhead 60, having an alternate roofshooter configuration. The difference between printhead 60 and the printhead 50 of FIG. 8 is that the heater substrate 65 of printhead 60 is in two parts 61 and 62, each having aligned through holes 63 and 64, respectively, shown in dashed line. Part 61 is the heater plate containing the heating elements, while part 62 is in the ink inlet plate. Filter 14 is sandwiched therebetween, by being first bonded to either one of the two confronting surfaces of parts 61, 62. Thus, the plurality of individual printheads with filters are also obtained by a sectioning operation such as dicing of the various patterned layers 51, 52, 61 and 62, plus the filter 14.

In recapitulation, this invention uses a wafer-sized substantially flat filter which is adhesively attached to a wafer sized fluid handling substrate. The filter may be bonded to the fluid handling substrate or wafer before, during, or after it has been aligned and bonded to the heating element wafer. The plurality of individual printheads are obtained in the usual way of sectioning the bonded printhead layers, the difference being that the filter is already bonded and must be concurrently sectioned. The filter covers the entire surface of the fluid handling layer of the printhead. In general, this concept applies to any printhead with one or more wafer substrate layers, the wafer-sized filter being laminated to one of these. The filter may be a woven, mesh type filter or, preferably, a membrane filter produced, for example, by electroforming or other photolithographically defineable processes.

In addition to filtering out contamination from the ink and ink supply system during printing, the filter also keeps dirt and other contaminating debris from entering the relatively large inlets during printhead assembly.

Many modifications and variations are apparent from the foregoing description of the invention and all such modifications and variations are intended to be within the scope of the present invention.

We claim:

1. A fluid filtering and handling device obtained by sectioning two or more layers of bonded material, comprising:

two or more substantially flat substrates, each having first and second parallel surfaces, the first surface of at least one of the substrates having a plurality of sets of recesses formed therein, the first surfaces of the substrates being aligned and bonded together, so that the sets of recesses form a plurality of sets of fluid directing passageways, the second surface of the substrate containing the recesses having a plurality of inlets, each inlet being in communication with a one of the sets of fluid directing passageways;

a substantially flat filter having a predetermined thickness, fluid passing pore size, and outer periphery, the filter being laminated to the second substrate surface with the inlets, the outer periphery of the filter being the same or larger than that of the substrate to which it is laminated; and a plurality of individual fluid handling devices with filters being obtained by concurrent sectioning of the bonded substrates and filter laminated thereto.

2. The fluid filtering and handling device of claim 1, wherein the said device is an ink jet printhead, said sets of passageways are sets of elongated ink channels with each set of ink channels having one end of each ink channel thereof connecting with an associated manifold, wherein each inlet is in communication with a respective one of the manifolds, and wherein the concurrent sectioning of the bonded substrates and laminated filter is accomplished by dicing, said dicing concurrently producing a plurality of ink jet printheads and opening the ends of each set of ink channels opposite the one connecting to the manifolds, so that the open channel ends serve as ink emitting nozzles.

3. The ink jet printhead of claim 2, wherein the printhead is a thermally actuated drop-on-demand ink jet printhead, and wherein the first surface of the substrate confronting the substrate with the recesses contains a plurality of sets of heating elements and addressing electrodes, one heating element being aligned with and located in a respective one of the ink channels a predetermined distance upstream from the nozzles.

4. The ink jet printhead of claim 3, wherein the filter is laminated to the surface of the substrate having the inlets by applying a relatively thin layer of adhesive to the entire surface of the filter which is to contact the substrate surface, said adhesive layer having a predetermined thickness which will be sufficient to bond the filter to the substrate and yet not reduce the transmission of fluid ink flowing into the printhead inlets through the filter.

5. The ink jet printhead of claim 4, wherein the filter is a photolithographically produced electroform of a material which is plateable, corrosion resistant to ink, diceable, and robust enough to permit handling.

6. ink jet printhead of claim 5, wherein the filter material is nickel, the thickness is 4 micrometers, the pore size is 18 micrometers, and the ink transmission of the filter is about 50%.

7. A method of fabricating a fluid filtering and handling device comprising the steps of:

forming a plurality of sets of recesses in a first surface of a substantially flat first substrate having parallel first and second surfaces, one of the recesses in each set being a through hole thus penetrating the second surface and forming an inlet therein;

aligning and bonding a first surface of a substantially flat second substrate having parallel first and second surfaces to the first surface of the first substrate;

laminating a substantially flat filter to the second surface of the first substrate, the filter having a predetermined thickness and fluid passing pore size, and an outer periphery that is equal to or larger than the second surface of the first substrate, so that the entire second surface of the first substrate is covered, including the inlets; and concurrently sectioning the bonded substrates and laminated filter to produce a plurality of fluid filtering and handling devices.

8. The method of fabricating the device of claim 7, wherein the first substrate is silicon, wherein each set of recesses comprise a plurality of parallel, elongated ink channels having first and second ends and a manifold which is in communication with the second ends of the ink channels, each manifold containing the through hole which serves as an inlet; and wherein the concurrent sectioning of the bonded substrate and filter is accomplished by dicing, the dicing concurrently opening the first ends of each set of ink channels, so that the fluid filtering and bonding device may serve as an ink jet printhead.

9. The method of fabricating the device of claim 8, wherein the second substrate is electrically insulative or semi-conductive and the first surface of the second substrate contains a plurality of sets of heating elements and addressing electrodes, after the two substrates are aligned and bonded together, each ink channel contains a heating element located a predetermined distance upstream from its channel open end, so that the device may serve as a thermally activated ink jet printhead.

10. The method of fabricating the device of claim 9, wherein the filter is an electroform.

11. An improved fluid handling device of the type adapted to serve as an ink jet printhead and having an ink fill hole in a one of its surfaces, a plurality of nozzles, individual channels connecting the nozzles to an internal ink supplying manifold, the manifold being supplied ink through a fill hole, and selectively addressable heating elements for expelling ink droplets on demand, the improved fluid handling device comprising:

a substantially flat filter having predetermined dimensions and being adhesively bonded to the printhead surface containing the fill hole, so that the entire fluid handling device surface containing the fill hole is covered by the filter.

12. The improved fluid handling device of claim 11, wherein the filter is woven mesh screen.

13. The improved fluid handling device of claim 11, wherein the filter is an electroformed flat filter having a predetermined thickness and pore size.

14. An improved fluid handling device having the configuration of an ink jet printhead of the type mass produced by the dicing of two planar parts, which are aligned and bonded together, into a plurality of printheads, one part containing on a surface thereof a plurality of linear arrays of heating elements and addressing electrodes, and the other part having a plurality of sets of concurrently etched recesses in a surface thereof, each set of recesses including a parallel array of elongated recesses for use as capillary filled ink channels and an associated recess for use as an ink reservoir, one end of the elongated recesses being placed into communication with a respective reservoir recess and the other end being opened to serve as nozzles, each reservoir recess being supplied with ink through a fill hole in said parts' opposite surface, the parts being aligned and bonded together so that each elongated recess becomes an ink channel with a heating element located a predetermined distance upstream from its nozzle, the improved printhead comprising:

a membrane type filter having surface dimensions at least equal to the surface dimensions of the planar parts and being adhesively attached to the parts surface containing the fill holes, so that the dicing operation which produces the plurality of printhead concurrently dices the filter.

15. The improved fluid handling device of claim 14, wherein the filter is a woven mesh screen.

16. The improved fluid handling device of claim 14, wherein the filter is an electroformed flat filter having a predetermined thickness and pore size.

17. An improved fluid handling device having the configuration of a thermal ink jet printhead of the type having a roofshooter configuration, the printhead having heating elements and nozzles which expel droplets on demand in a direction normal to the heating elements, the printhead having an electrically insulative flat substrate with the heating elements formed on one surface thereof adjacent a through hole which serves as both inlet and reservoir, wherein the improvement comprises:

a substantially flat filter having predetermined dimensions and being bonded to the printhead substrate surface opposite the surface with the heating elements, so that the entire surface of the printhead is covered including the inlet.

18. The improved fluid handling device of claim 17, wherein the substrate containing the heating elements and through holes is comprised of two separate layers with aligned through holes, the filter being applied to either confronting surface of the separate layers so that the filter is sandwiched therebetween.

* * * * *